INVENTOR.
OSWALD R. BERGMANN

INVENTOR
OSWALD R. BERGMANN

Aug. 5, 1969     O. R. BERGMANN     3,459,515
CERMETS OF ALUMINUM WITH TITANIUM CARBIDE AND TITANIUM
AND ZIRCONIUM BORIDES Filed March 31, 1964            5 Sheets-Sheet 4

INVENTOR
OSWALD R. BERGMANN

BY *John H. Tregoning*
ATTORNEY

Aug. 5, 1969       O. R. BERGMANN       3,459,515
CERMETS OF ALUMINUM WITH TITANIUM CARBIDE AND TITANIUM
AND ZIRCONIUM BORIDES
Filed March 31, 1964                5 Sheets-Sheet 5

INVENTOR.
OSWALD R. BERGMANN
BY

3,459,515
CERMETS OF ALUMINUM WITH TITANIUM CARBIDE AND TITANIUM AND ZIRCONIUM BORIDES
Oswald R. Bergmann, Cherry Hill Township, Camden County, N.J., assignor to E. I. du Pont de Nemours and Company, Wilmington, Del., a corporation of Delaware
Continuation-in-part of application Ser. No. 259,698, Feb. 19, 1963, which is a continuation-in-part of application Ser. No. 143,125, Oct. 5, 1961. This application Mar. 31, 1964, Ser. No. 356,699
Int. Cl. B01k 3/06; B22f 3/00
U.S. Cl. 29—182.8
8 Claims

ABSTRACT OF THE DISCLOSURE

Strong, current-conducting cermets useful, e.g., as electrodes in electrolytic cells, comprise a finely divided ceramic component of titanium carbide, alone or in admixture with titanium boride and/or zirconium boride, which ceramic component is bonded by about from 10 to 30% aluminum based on the total weight of the cermet. These cermets are characterized by being substantially free of self-bonding between the particles of ceramic component and having substantially all of such particles coated with metallic aluminum.

---

This application is a continuation in part of my copending application Ser. No. 259,698, filed Feb. 19, 1963, now abandoned, which in turn is a continuation in part of my copending application Ser. No. 143,125, filed Oct. 5, 1961, now U.S. 3,178,807.

The novel cermets of this invention comprise a finely divided ceramic component selected from the group consisting of titanium carbide (TiC), titanium boride (TiB$_2$), zirconium boride (ZrB$_2$) and mixtures thereof, bonded by from about 10% to about 30% of aluminum, based on the total weight of the cermet, said cermets being characterized by being essentially free of self-bonding between particles of the finely divided ceramic component and having substantially all of the particles of the ceramic component coated with metallic aluminum. The novel cermets are further characterized by having a maximum electrical resistivity of 50×10$^{-6}$ ohm-cm. at room temperature, a transverse rutpure strength of at least about 20,000 pounds per square inch at room temperature, and a thermal shock resistance such that they withstand an abrupt temperature change of at least 400° C. without cracking and without deleterious effects.

The current-conducting cermets are used as improved electrodes or current leads in electrolytic cells for producing metals, e.g., aluminum. For producing aluminum, these electrolytic cells are generally of two types, i.e., a reduction cell in which alumina in a suitable flux or electrolyte, such as a cryolite, is reduced to the free metal, and the three-layer cell in which impure aluminum beneath a flux is refined electrolytically. By a "cryolite" as used herein is meant an alkali metal aluminum fluoride, e.g., Na$_3$AlF$_6$. These cells have certain features in common and conventionally comprise a base and side walls of a metal, a lining of magnesite or some other refractory material resistant to the action of the fluxes, a bottom or innermost lining of carbon which is in electrical contact with iron or steel current supply bars embedded in the base of the cell, and current supply electrodes or leads which establish an electrical connection from an external source of supply of electrical current to (1) a body of molten aluminum which collects at the base of a reduction cell, (2) a body of aluminum alloy forming the bottom layer in a three-layer cell, or (3) the body of highly purified aluminum forming the top layer in a three-layer cell. Such cells are described in detail in U.S. Patent. 3,028,324.

The current-conducting elements, e.g., cathodes, current leads, etc., described in the foregoing patent are self-bonded elements, i.e., elements in which particles of titanium carbide, titanium boride, or other transition metal carbides or borides are sintered so that they adhere directly to each other. Such elements represent an improvement over conventional graphite current leads, but have not been satisfactory in providing an electrical conductivity required for commercially acceptable cell efficiency except at excessive cost and at the expense of thermal shock resistance. One sintered titanium carbide element having a porosity of 20% by volume had an electrical resistivity of 54×10$^{-6}$ ohm-cm., and even when the element was wetted with molten aluminum the resistivity was still 51×10$^{-6}$ ohm-cm. The aluminum content of the sintered element after wetting with molten aluminum was considerably less than 10% by weight of the element. While the electrical resistivity of such sintered elements can be reduced to lower levels by the use of pure boride (particularly titanium boride), this expedient imposes a severe economic penalty since pure titanium boride is more expensive and less readily available than the carbide. The use of carbide/boride mixtures alleviates the economic burden somewhat from the standpoint of cost of the current-conducting elements, but cell efficiency is reduced owing to the increase in resistivity incurred.

In addition, the elements described in the foregoing patent have a thermal shock resistance such that they can withstand a temperature differential of only 200–350° C. without cracking, the maximum thermal shock resistance being obtained with expensive, pure TiB$_2$. While greater thermal shock resistance is desirable, an improvement is difficult, if not impossible, to achieve in these sintered products owing to the high modulus of elasticity of the carbides or borides. Oxidation resistance of the sintered elements also does not meet the standards desired.

The novel cermets of the present invention overcome the deficiencies of the prior-art sintered products in that they have a comparable or lower electrical resistivity and greater thermal shock resistance than the sintered carbides and borides, all at significantly lower costs. Cermets of this invention have an electrical resistivity in the range of about 5 to 50×10$^{-6}$ ohm-cm. Their thermal shock resistance is such that they withstand an abrupt temperature change of 400° C. or more without cracking. That the deficiencies in prior-art sintered electrodes could be overcome by eliminating self-bonding of the ceramic component and cementing with aluminum is surprising because operation of an aluminum cell requires temperatures considerably in excess of aluminum's melting point (660° C.) where the cermet would not be expected to have any useful strength.

In addition, the cermets possess other features required in current-conducting elements for electrolytic aluminum cells, i.e., a transverse rupture strength at room temperature of at least about 20,000 pounds per square inch; adequate transverse rupture strength at temperatures where aluminum is molten; high resistance to oxidation, to molten aluminum, and to electrolytic baths; and satisfactory wettability by molten aluminum.

The essential ingredients of my current-conducting elements are titanium carbide, titanium boride, zirconium boride, or any mixtures of said materials with each other, and about 10–30% by weight of aluminum, some of which can be present as combined aluminum. The individual ceramic grains or particles are surrounded by a continuous film of metallic aluminum which acts as a cementing layer so as to result in a strong dense mass of cemented grains or particles as contrasted to continuous skeletal networks of self-bonded carbide and/or boride particles having pores containing aluminum.

The cermets of my invention may contain components other than aluminum and the depicted borides and carbides provided such components are not present in amounts sufficient materially to affect the desirable characteristics of the cermets as current-conducting elements. The cermets preferably are composed of at least 90% by weight of metallic aluminum and titanium carbide, titanium boride and/or zirconium boride.

The presence of aluminum in the cermet as well as the absence of self-bonding between the particles of the ceramic component significantly enhance the electrical conductivity and thermal shock resistance characteristic of the current-conducting elements as contrasted to self-bonded elements. Higher electrical conductivity (or lower electrical resistivity) is achieved in the present current conductors without the need of using pure borides, which are expensive. If pure borides are used, however, the present cermets give a lower electrical resistivity, i.e., as low as about $5 \times 10^{-6}$ ohm-cm., than has been achieved heretofore in current-conducting elements used in aluminum electrolytic cells.

The aluminum in the cermets is either free aluminum or a mixture of free aluminum with an intermetallic compound, TiAl and/or $TiAl_3$. The latter compounds may or may not be found in the cermets containing titanium compounds, depending on the preparative conditions, as will be discussed more fully hereinafter. If aluminum is present as an intermetallic, it appears as a dispersed phase and not a coating on the ceramic component.

Cermets of the invention are obtained by one of two methods. According to one method, the finely divided ceramic component and a quantity of aluminum sufficient to provide about from 10% to 30% by weight of aluminum in the final cermet are placed in a container, the outer wall of the container is surrounded with a layer of a detonating explosive, the explosive layer initiated, and thereafter the compact thus formed, heated to a temperature above the melting point of the aluminum and below the minimum temperature at which sintering (i.e., self-bonding) of the ceramic component occurs, e.g., below 1500° C., and in most cases below 1100° C., preferably in an inert or reducing atmosphere.

An alternate process for the preparation of the novel cermets comprises cold-pressing a finely-divided mixture of the ceramic and aluminum components, heating the cold-pressed compact, preferably in an inert or reducing atmosphere, to a temperature above the melting point of aluminum and below the temperature at which sintering (self-bonding) of the ceramic component occurs, and then cooling the heated compact to solidify the aluminum.

The process wherein the compact is formed by explosive means is a preferred process because the cermet formed has greater strength at high temperatures than that formed using the cold-pressing to make the compact. The superiority of the explosively compacted cermet is believed to be related to its low degree of porosity relative to that of the cold-pressed cermet (above 10% by volume for the latter). The properties of the cold-pressed cermet preferably are improved by immersing it in molten aluminum to fill some of the pores. The products made by both of the pressing-heating procedures are cermets within the sense and scope of this invention provided they have the requisite electrical resistivity, transverse rupture strength, and thermal shock resistance described above. The benefits gained by immersing the explosively compacted product are not as great as those gained by immersing the cold-pressed product but immersion of the explosively compacted product is beneficial in cases where additional aluminum is desired in the product, or where superior transverse rupture strength is required, e.g., on the order of about 40,000 pounds per square inch or higher. Thus, an explosively compacted product which has been immersed in aluminum is a preferred product.

For a more complete understanding of the nature and of the preferred method of preparing the novel cermets, and of the method of producing aluminum by the use of the novel cermets ar current leads, reference is made to the attached drawings illustrating the microstructure of the novel cermets and various assemblies for subjecting the carbide or boride and the aluminum to the action of the detonating explosive as well as various embodiments of electrolytic cells wherein:

FIGURE 9b is a cross-sectional view taken through line A–A' of FIGURE 9a.

In the drawings, like numbers indicate similar elements of the three assemblies and the electrolytic cells.

Figure 1A:
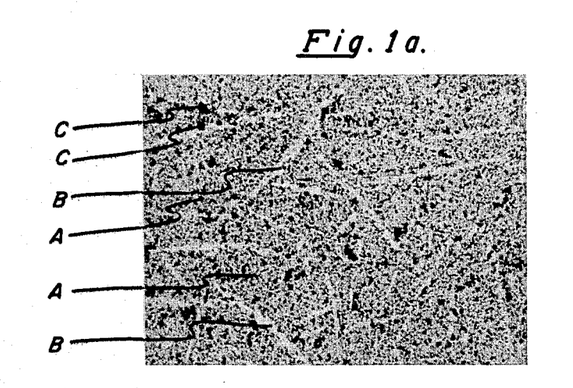
FIGURE 1a is a photomicrograph of a novel cermet.

In FIGURE 1a which is a photomicrograph at a magnification of 76 of a section of a novel cermet in which the ceramic component is titanium carbide cemented by a total of 25% by weight of aluminum which section has been polished and etched in alkaline potassium ferricyanide, A indicates particles of titanium carbide coated with and cemented by aluminum, B indicates needles and/or plates of the intermetallic compounds, TiAl and $TiAl_3$, and C indicates pores in the novel cermet.

Figure 1B:
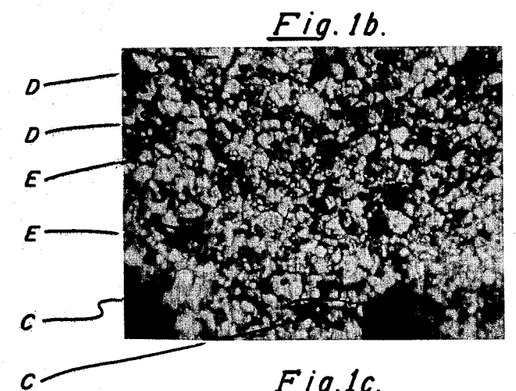
FIGURE 1b is a photomicrograph of a portion of the cermet shown in FIGURE 1a, FIGURE 1c is a schematic drawing of a portion of the cermet shown in FIGURES 1a and 1b.

FIGURE 1b is a photomicrograph at a magnification of 1500 of a portion of the novel cermet shown in FIGURE 1a, i.e., a portion A of the cermet of FIGURE 1a. In this photomicrograph for which the cermet was polished and etched as described above, D indicates particles of titanium carbide and E indicates aluminum which coats and cements the particles of titanium carbide D. Again C indicates pores in the microstructure of the novel cermet.

Figure 1C:
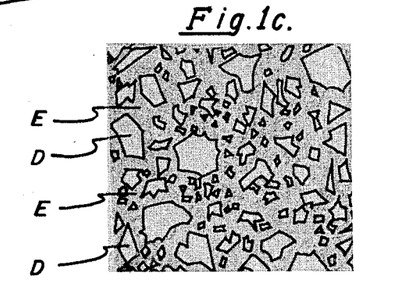

In FIGURE 1c which is a schematic drawing at a magnification of about 2000 of a portion A of the cermet shown in FIGURES 1a and 1b the unsintered character, i.e., the absence of self-bonding between the particles, of the titanium carbide is apparent. Again D indicates particles of titanium carbide and E indicates aluminum. As is well known to one skilled in the art, sintering, in which the driving force is surface energy, involves a growth in contact area between initially distinct particles of, e.g., titanium carbide, which in turn involves considerable material transport and reduction in the total surface area of the titanium carbide. Since spherical particles represent the minimum surface area, during sintering titanium carbide particles tend to lose their rough edges and to become rounded as well as to join to one another to form a self-bonded, skeletal ceramic network. As is obvious in FIGURE 1c the particles of titanium carbide have neither become bonded to one another nor lost the rough edges characteristic of unsintered ceramic materials.

Figure 2:
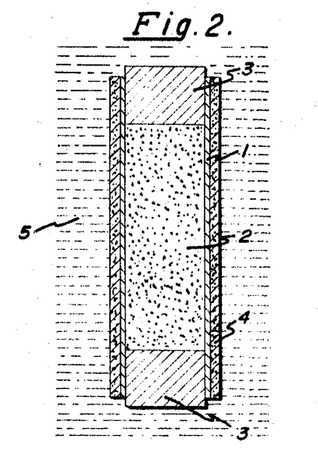
FIGURE 2 represents a longitudinal cross-sectional view of an assembly for use in preparing cermets in solid cylindrical form.

In FIGURE 2, metal tube 1, filled with a mixture of the ceramic and aluminum powders 2, is sealed with metal plugs 3. The outside wall of metal tube 1 is surrounded with a layer of a detonating explosive 4 and the assembly is immersed in water 5.

Figure 3:
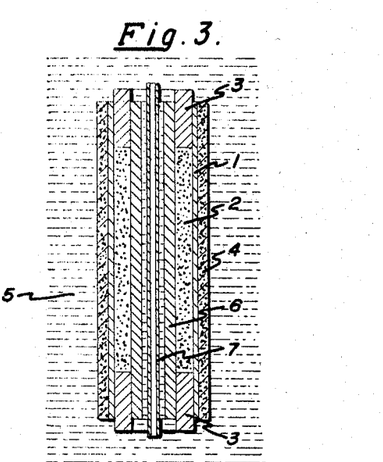
FIGURE 3 represents a longitudinal cross-sectional view of an assembly for use in preparing cermets in tubular form.

In FIGURE 3, metal tube 6 is positioned essentially concentrically within metal tube 1. The annulus between the adjacent walls of the two tubes is filled with a mixture of the ceramic and aluminum powders 2 and the ends of the annulus are sealed with metal plugs 3. An air-filled metal tube 7 closed at both ends is fastened by taping essentially concentrically within metal tube 6 to absorb the energy of shock waves converging in the center of the assembly. The outside wall of metal tube 1 is surrounded with a layer of a detonating explosive 4 and the assembly immersed in water 5, which flows into the annulus between metal tube 6 and the metal tube 7.

Figure 4:
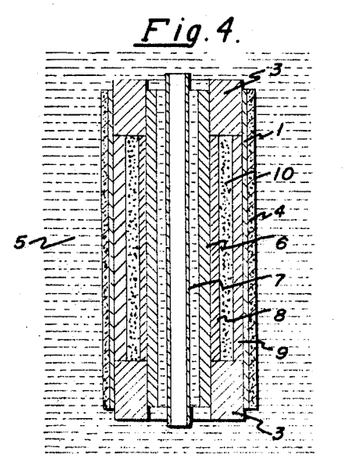
FIGURE 4 represents a longitudinal cross-sectional view of an assembly for use in preparing cermets in which the aluminum is provided in non-particulate form.

In FIGURE 4, metal tube 6 is inserted through the bore of metal tube 8 which metal tube 8 comprises the aluminum to be incorporated into the novel cermet. Metal tube 9, also comprising the aluminum to be incorporated into the novel cermet, is inserted within the bore of metal tube 1 and the first set of tubes 6 and 8 is positioned essentially concentrically within the second set of tubes 9 and 1. The annulus between the adjacent walls of tubes 8 and 9 is filled with the ceramic powder 10 and sealed with metal plugs 3. An air-filled metal tube 7 closed at both ends is fastened by taping essentially concentrically within metal tube 6 as in FIGURE 3. The outside wall of metal tube 1 is surrounded with a layer of a detonating explosive 4 and the assembly immersed in water 5 which flows into the annulus between tubes 6 and 7.

The composition of tubes 1 and 6 is not critical since these tubes merely serve to contain the ceramic and aluminum components of the novel cermets during detonation; however, these tubes obviously must have sufficient strength to withstand the detonation pressure. In the assemblies of FIGURES 2 and 3 a lining of paper, or of another suitable material, interposed between the walls of the tubes and the ceramic-aluminum powder mixture prevents infiltration of metal from the tubes into the mixture.

Although I do not intend to be limited by any theory of the mechanism by which the novel aluminum-cemented cermets are formed, I believe that a brief discussion of the probable mechanism of the preferred method of preparation will elucidate the value of various modifications and the reasons for its superiority over more conventional procedures for cermet preparation.

One of the criteria for a satisfactory binder metal for carbides and borides is that the binder form a liquid phase at some point during the preparation of the cermet, which liquid phase "wets" the carbide or boride phase. This "wetting" presupposes intimate contact between the surfaces of the ceramic and metal binder components. However, the oxide film which so readily forms on aluminum makes difficult the establishment of intimate contact between ceramic and aluminum surfaces, e.g., in conventional operations such as cold-pressing and hot-pressing which involve application of pressure to a fine dispersion of ceramic and metal powders with and without simultaneous application of heat to the dispersion, and the preparation of cermets by these operations. Although cold-pressing and hot-pressing disrupt the oxide film at a number of points, the pressure is applied over a relatively long time, e.g., longer than ½ second. Thus there is sufficient time during cold- or hot-pressing for the oxide to reform as compression proceeds with the result that the number of points of intimate contact between carbide and/or boride and metal is decreased. Similar problems encountered with other metals such as cobalt and nickel are overcome by sintering in a hydrogen atmosphere, thereby reducing the metal oxide film. However, this scheme is not practical with aluminum systems since the oxide of this metal is not reduced by hydrogen under convenient operating conditions, i.e., atmospheric pressure and temperatures up to ca. 1500° C.

In each of the assemblies illustrated above in FIGURES 2 and 3, the surfaces of ceramic powder particles are initially in contact with the surfaces of aluminum powder particles which surfaces are coated, as would be expected, with an oxide film. The pressure of the shock waves generated by the detonation of the layer of explosive surrounding the assembly constricts the metal tube(s) thereby mechanically increasing the density of the powder mixture. At the same time, this pressure mechanically ruptures the oxide film thus bringing the surfaces of ceramic powder particles into intimate contact with oxide-free aluminum within a few microseconds. Similarly, in the assembly illustrated in FIGURE 4, the surfaces of ceramic powder particles are in contact with the oxide-coated, adjacent surfaces of aluminum tubes 8 and 9. As described above, the oxide film is ruptured by the pressure of the shock waves and the surfaces of ceramic powder particles are brought into intimate contact with oxide-free aluminum within microseconds.

In either case, the ceramic-aluminum system is heated to a temperature at which the metal melts to form a liquid phase which "wets" the ceramic particles and, under the influence of high surface forces, flows into the pores between the carbide and/or boride particles. Neither the explosive treatment nor the heating raises the ceramic-aluminum system above the minimum sintering temperature of the ceramic component and essentially no self-bonding of the ceramic component takes place.

In the explosive compaction method, evacuation of the assembly prior to explosive treatment minimizes the porosity of the cemented compositions. The additional precaution of heating the remaining tube assembly unopened or in a reducing atmosphere precludes the possibility of the reformation of metal oxide as the aluminum flows around the carbide and/or boride particles. However, the need for this precaution is more urgent when using the assembly illustrated in FIGURE 4 than when using the assemblies illustrated in FIGURES 2 and 3. In the latter cases, the aluminum is provided in finely divided form and the pressure of the shock waves disrupts the oxide film establishes many more areas of intimate contact between carbide and/or boride and the oxide-free aluminum than can be achieved in the assembly of FIGURE 4 in which the aluminum is provided in the form of a sheath for a centrally disposed mandrel (metal tube 6) and in the form of a liner for metal tube 1. Furthermore, since the ceramic and aluminum powders are thoroughly blended prior to compaction, during the heating step a given quantity of aluminum has to flow only a relatively short distance before the carbide and/or boride particles are completely surrounded by the aluminum binder which factor reduces the probability of the reformation of oxides. As explained above, the effect of the shock waves is to disrupt the metal oxide film and bring the carbide and/or boride into intimate contact with reactive, oxide-free aluminum.

The composition, means of initiation, loading, velocity of detonation, and confinement of the detonating explosive layer used in the preferred method of preparation of the novel cermets are not critical. It will be apparent to one skilled in the art that a sufficient quantity of explosive to effect the destruction of the oxide film without damaging the assembly should be used. A thin layer of a flexible explosive composition is conveniently wrapped around the outer tubes of the preferred assemblies as illustrated in the attached drawings. The layer of detonating explosive may be initiated by means of a line-wave generator (as described in U.S. Patent No. 2,943,571 issued July 5, 1960), which in turn may be initiated by means of a conventional electric blasting cap. The containing tubes, i.e., 1 and 6, can be removed mechanically before or after heating, or melted off. Heating can be effected with any of the several conventional modifications with respect to temperature, rate of heating and cooling, atmosphere, etc.

The ceramic and aluminum components can be provided in a number of forms. Generally commercially available powders of particle size smaller than 75 microns are desirable; however, cermets have been successfully prepared using 840-micron aluminum powder. If the diameter of the tubular container of FIGURE 4 is very small, a sufficient quantity of the aluminum component can be provided in the form of a liner for the container thus obviating the need for the metal-sheathed centrally disposed mandrel. The aluminum can also be in the form of wires or rods extending through a mass of the carbide and/or boride powder.

When the ceramic component of the novel cermet contains titanium carbide, one or both of the intermetallic compounds, TiAl and $TiAl_3$, crystallizes from supersaturated solutions of titanium in aluminum formed when, after explosive treatment or cold-pressing, the ceramic-aluminum compact is heated above the melting point of aluminum, e.g., at about 800° C., and subsequently cooled. However, when the ceramic component contains substantially no carbide, intermetallic compounds do not form during the course of the preparation of the novel cermets by either of the methods described above, unless temperatures of at least about 1300° C. are employed. It is believed that intermetallic formation occurs via a reaction between aluminum and a titanium oxide on the carbide or boride surface. In the case of a boride, however, boron oxide on the boride surface might inhibit the reaction between the titanium oxide and aluminum until considerably higher temperatures are reached. In any case, the intermetallic compound(s) do not form in amounts sufficient to have any significantly deleterious or advantageous effect on the cermet.

Using the assemblies illustrated in FIGURES 2 and 3, and using the cold-pressing technique described above, the composition of the cermets is primarily controlled by blending the titanium carbide, titanium boride, and/or zirconium boride and aluminum in the desired proportions. The relative amounts of aluminum and carbide and/or boride used in the cermets can be varied to obtain specific physical properties desired for particular electrolytic cell designs and environments. However, care should be taken that the amount of aluminum (free aluminum or total free and combined aluminum) present in the final cermet is at least about 10 percent and does not exceed about 30 percent by weight of the final cermet. Cermets containing less than about 10 percent of aluminum have too high an electrical resistivity, too low an oxidation resistance, and too low a thermal shock resistance to be used to advantage as current-conducting elements in electrolytic cells; cermets containing more than about 30 percent of aluminum have insufficient strength to be practical for use at cell operating temperatures. A preferred range of aluminum content, with consideration given to the best combination of conductivity and strength properties, is about from 15 to 25 percent by weight. The novel cermet having an aluminum content within the preferred range has a maximum electrical resistivity of about $45 \times 10^{-6}$ ohm-cm., an axidation resistance such that its weight gain after 17 hours at 1000° C. in air is a maximum of 5 milligrams per square centimeter of surface, a thermal shock resistance such that it withstands an abrupt temperature change of 600° C. or more without cracking, and a transverse rupture strength at room temperature of at least about 30,000 pounds per square inch. The conductivity of the novel cermets increases with the weight percent of aluminum present in the cermets and the amount of aluminum incorporated into a particular cermet will, in part, depend upon the conductivity or resistivity desired in the final cermet. Any mixture of titanium carbide, titanium boride, and zirconium boride in various proportions can be incorporated into the novel cermets within the sense and scope of this invention. However, on the basis of economy and availability as well as of property requirements, a preferred cermet is one which contains about 10–60 percent of titanium boride, based on the weight of the cermet, the remainder of the ceramic being titanium carbide.

In accordance with an embodiment of the present invention, an electrolytic cell for the production or refining of aluminum is provided which comprises a container, said container holding a solution of alumina and an alkali metal cryolite, and at least two solid electrodes adapted to provide a current for said cell, at least one of said electrodes being a novel cermet of the present invention as described hereinabove.

In a preferred embodiment of this invention, an electrolytic assembly for the manufacture of aluminum is provided which comprises a container, said container holding a solution of alumina and an alkali metal cryolite, and at least two said solid electrodes adapted to provide a current for said cell, at least one of said electrodes being a novel cermet of the present invention as described hereinabove.

In another such embodiment of this invention there is provided an electrolytic cell for the refining of aluminum which comprises a container, said container holding, in sequence from the bottom, a body of molten impure aluminum and a solution comprising a cryolite, aluminum fluoride, barium fluoride, and alumina and at least two solid electrodes adapted to provide a current for said cell, at least one of said electrodes being a novel cermet of the present invention as described hereinabove.

For a more complete understanding of the methods of manufacturing and refining aluminum in accordance with the invention, by the use of the aluminum-bonded cermets as current leads, reference is made to the attached drawings.

Figure 5:
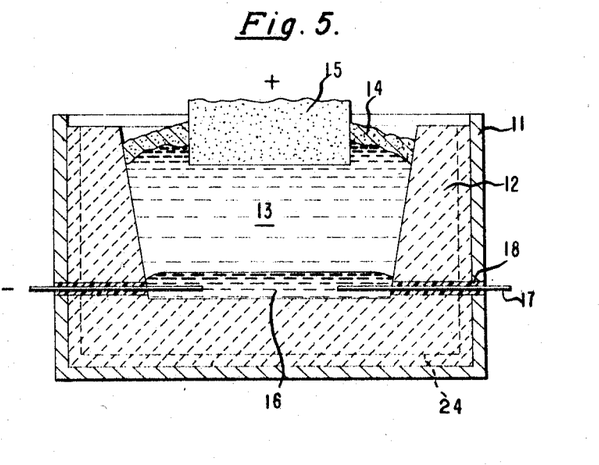
FIGURE 5 represents a vertical cross-sectional view of one embodiment of an electrolytic reduction cell using the novel cermets as current leads which project through the side wall and lining into the molten aluminum.
Figure 6:
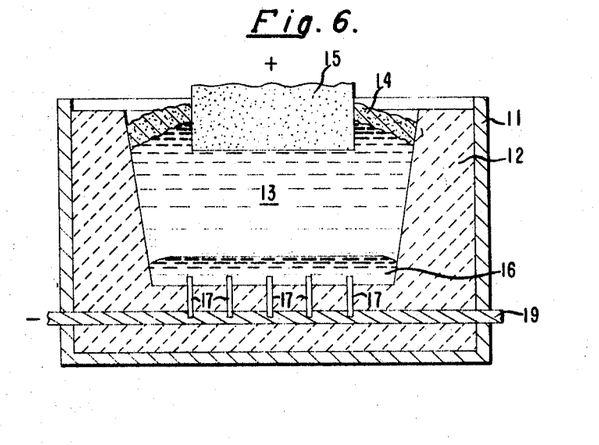
FIGURE 6 represents a vertical cross-sectional view of another embodiment of an electrolytic reduction cell using the novel cermets as current leads which project upwards through the base of the cell into the molten aluminum.

Referring now to FIGURES 5 and 6 depicting electrolytic reduction cells, 11 represents a metal container or shell, e.g., of steel or iron, having a lining 12 of carbon or refractory material, e.g., brick, and, if desired, an additional lining 24 of an insulating material, e.g., magnesite or bauxite, etc., between the carbon or refractory lining and metal walls of the container. The molten or fused electrolyte bath of flux 13 is contained within the lining walls and consists of dissolved alumina and sodium, potassium, or lithium cryolite (or a mixture thereof) as the electrolyte to which may be added small amounts of modifying substances, e.g., sodium or lithium chloride, potassium or lithium fluoride, etc., which decrease the freezing point of the bath. A solid crust or cake 14 which comprises solidified bath constituents and alumina covers a portion of bath 13 and surrounds the anode 15 of the conventional carbon type, e.g., either prebaked or self-baked, known to the art. The anode is connected to a positive source of electric current (not shown) and dips into bath 15. The aluminum-bonded titanium carbide, titanium boride and/or zirconium boride cermet current leads 17 project into the pool of molten aluminum 16 lying at the base or bottom of bath 13. The leads 17 are inserted through apertures in the metal wall and/or linings of the cell and are held in position, in the case of FIGURE 5, by a sealing material 18, e.g., pitch which hardens at the operating temperature, i.e., approximately 900–1100° C., of the bath and, in the case of FIGURE 6 by being bolted or welded to a metal bus bar 19, e.g., of steel or iron. The portion of the current lead 17 extending outside wall 11 in FIGURE 5 and the portion of the bus bar extending outside wall 11 in FIGURE 6 are connected to negative sources of current.

In another embodiment of an electrolytic reduction cell (not shown) of the type depicted in FIGURE 5, an alternative disposition of the current leads 17 involves current leads inserted downward through the solidified crust 14, alongside the sloping side wall of carbon into the molten pool of aluminum 16.

Figure 7:
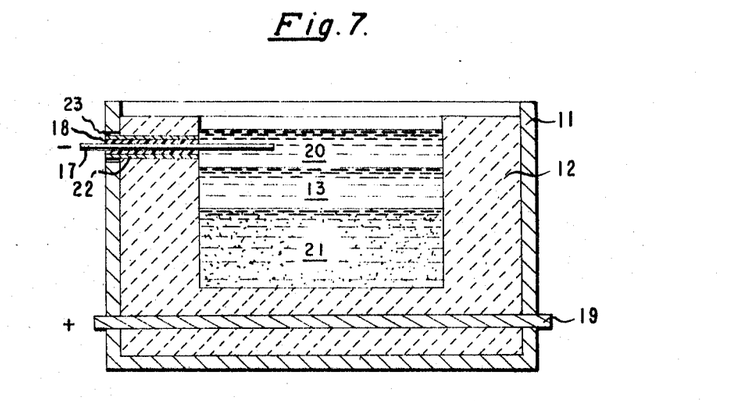
FIGURE 7 represents a vertical cross-sectional view of a three-layer electrolytic cell for the purification of aluminum, embodying the novel cermets as current leads which project into the top layer of molten purified aluminum.
Figure 8:
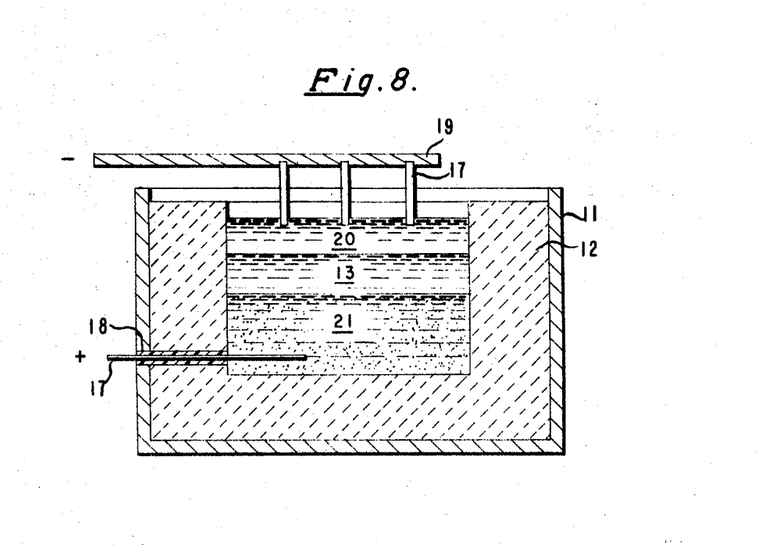
FIGURE 8 represents a vertical cross-sectional view of another embodiment of a three-layer electrolytic cell in which the novel cermets project down into the top layer of molten purified aluminum and through the side wall and lining into the molten aluminum alloy.

Referring to FIGURES 7 and 8 depicting three-layer electrolytic cells, 11 represents a metal container or shell, e.g., of steel or iron, having a lining 12 of carbon or refractory material, e.g., brick, and, if desired, an additional lining of an insulating material, e.g., of magnesite or bauxite, etc., between the carbon or refractory lining and metal walls of the container. Contained within lining 12 is the layer (cathode) 20 of purified molten aluminum which floats on the molten flux 13 consisting essentially of a cryolite, aluminum fluoride, barium fluoride, and alumina. Flux 13, in turn, floats on a layer (anode) 21 of molten impure aluminum or an aluminum alloy constituting the bottom layer. The aluminum alloy generally contains a high proportion of copper, e.g., 25% or more, to increase its density. One or more of the aluminum-bonded titanium carbide, titanium boride, and/or zirconium boride cermet current leads 17 project into the molten layer of purified aluminum 20 or molten layer of aluminum alloy 21.

In FIGURE 7, the current lead(s) 17 project into the molten layer of purified aluminum 20 through aperture(s) in the metal wall and lining(s) of the cell and are connected to a negative source of electrical current. The current lead 17 is held in position by any suitable means, e.g., by a sealing material 18, e.g., of pitch, which hardens at the operating temperature, i.e., approximately 700–800° C., of the cell or by being imbedded in or welded or bolted to a metal bus bar (not shown) attached to a negative source of electrical current. An electrical insulating material 22, e.g., a refractory material, in combination with an air gap 23 prevents short-circuiting through the shell 11 of the current 17 and the metal bus bar 19 which is connected to a positive source of electrical current.

In FIGURE 8, the current leads 17 supply current to both the cathode molten layer of purified aluminum 20 and the anode molten layer of aluminum alloy 21. The current leads 17 dip into molten layer of purified aluminum 20 and are attached by any suitable means, e.g., by being bolted to, welded to, or imbedded in a metal bus bar 19 which is connected to a negative source of current. The current lead 17 passing through wall 11 and lining(s) 12 into layer 21 is held in position by any suitable means, e.g., those discussed in connection with FIGURES 5–7, and is connected to a positive source of electrical current.

As evidenced from the foregoing discussion, the current leads 17 may be inserted into the cell in various ways, e.g., through a side wall, vertically through the bottom, or vertically or at an inclination into the metal pool from above. The distance which the current leads project into the molten metal is such that the current lead short-circuits the high-resistance path offered to the current flow by the sludge which generally builds up between the carbon interface and metal. Usually the current leads project at least approximately 1–2 inches into the molten metal.

The cermet current leads of the invention may be of any desired size or shape, e.g., rods, plates, etc. The current leads generally, however, are in the form of cylindrical rods 1–3 inches in diameter and up to 26 inches in length.

The provision of a sufficient number of current leads uniformly distributed throughout a part of the molten metal layer will improve electrical conductivity and, consequently, the efficiency of the cell. For example, in a small pre-baked anode cell, normally rated at 16 ka., generally 24–30 tubular current leads are adequate. Of course, with larger cells, additional current leads are provided.

In an example of the operation of the process in a reduction cell such as those shown in FIGURES 5 and 6, the electrolytic solution is maintained at approximately 900–1100° C. while electric current is passed through the electrolytic solutions, the current density generally being maintained at an average value of 5 amperes per square centimeter. A molten aluminum pool forms rapidly and is collected at the base of the cell. This molten aluminum is withdrawn at intervals, e.g., by siphoning off in a known manner, additional alumina being added as needed during the operation. Because of the superior thermal shock resistance of the novel cermets of the invention, the cermet electrodes do not require preheating before contacting the molten metal in the cell.

In an example of the operation of the process in a three-layer cell for refining impure aluminum, e.g., those cells shown in FIGURES 7 and 8, the electrolytic solution is maintained at approximately 700–800° C. by the passage of electric current through the electrolytic solution. The molten refined aluminum collecting as the top layer is removed by conventional procedures, and the impure aluminum, e.g., copper-aluminum alloy, is replenished as needed in the operation.

During the operation of the electrolytic cells described above, the carbon or refractory lining 12 undergoes a certain amount of expansion, heaving, and shifting. This results in the exertion of lateral and longitudinal forces upon the cermet current leads 17, with the possibility of ultimate breakage of the leads and loss of electrical contact. The situation can be remedied by employing as a lead rod or plate a multi-unit assembly of the cermets of this invention, said assembly being comprised of two or more rods or plates connected to each other by integral mechanical joints which permit flexing and extension of the assembly. Typical kinds of joints are, for example, tongue-in-groove held by a pin (also a cermet), ball-in-socket, etc. The configurations necessary can be achieved either by machining the prepared cermets, or by pressing the powders into the desired shape during the cermet preparation. Electrical contact between the units of the assembly is maintained through the contacting surfaces in the joints. The assembly preferably is immersed in molten aluminum prior to insertion into the cell to insure good electrical contact between units. This aluminum becomes molten at the cell operating conditions; thus, the flexibility and extensibility of the assembly is not impaired.

Figure 9A:
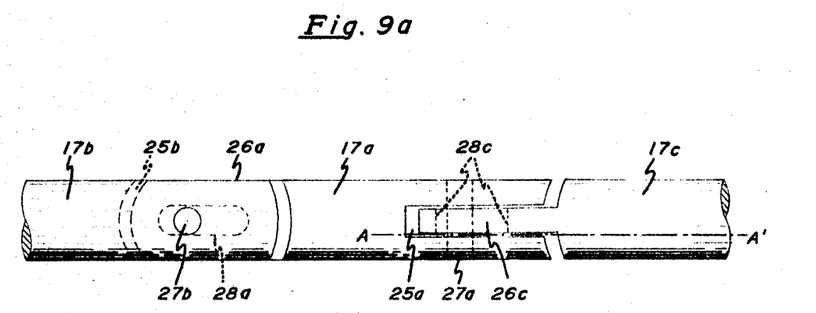
FIGURE 9a is a top view of a multi-unit assembly of the cermets of the present invention designed to provide flexibility to a current lead.
Figure 9B:
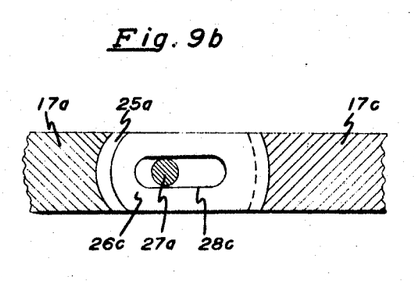

A preferred embodiment of a flexible, extensible cermet assembly is depicted in FIGURES 9a and 9b.

In FIGURES 9a and 9b, a cermet rod 17a is provided with a slot 25a at one end thereof and a tongue 26a at the opposite end thereof. Cermet rod 17c has a tongue 26c which fits into slot 25a; and tongue 26a fits into slot 25b in cermet rod 17b. Tongues 26a and 26c have oval apertures 28a and 28c therethrough, respectively. Cermets 17a and 17b have circular apertures passing through opposite sides of slots 25a and 26b, respectively. The tongues fit into the slots in a manner such that the circular apertures passing through the sides of slot 25a are aligned with aperture 28c, and those passing through the sides of slot 25b are aligned with aperture 28a. Circular cermet pins 27a and 27b pass through each set of aligned apertures and force fit into the circular apertures. The two pins are at a 90° angle to one another. This arrangement permits flexing or pivoting in two planes. The assembly also has extensibility owing to the mobility of the tongues in a direction normal to their axis of rotation. If desired, rotation can be provided in a single plane by suitable arrangement of the apertures.

As an example of the preparation and use of such a flexible and extensible assembly, four cermet rods such as the one denoted by 17a in FIGURE 9a have a 3-inch diameter and 6-inch over-all length, the slot and tongue in each cermet being 2.5 inches long, and the distance between slot and tongue on the same cermet therefore being one inch. The four cermets are joined by placing the tongues in the slots and inserting a cermet pin in each set of aligned apertures. Two additional cermets of 3-inch diameter and 6-inch over-all length, one having a 2.5-inch-long slot and the other a 2.5-inch-long tongue are joined, each to its mating unit, to the end rods of the assembly, making six rods in all and forming an assembly 23.5 inches long. The assembly is immersed in molten aluminum, cooled, and then inserted in the cell depicted in FIGURE 5, i.e., as rod 17.

The following examples illustrate some of the aluminum-cemented titanium carbide, titanium boride, and zirconium boride cermets of the present invention and methods for their preparation. They are intended as illustrative only, however, and are not to be considered as exhaustive or limiting. In the examples, percentages are by weight.

The explosives employed in these examples are in the form of extruded flexible sheets of compositions designated as compositions A and B.

Compositions A contains 20% very fine pentaerythritol tetranitrate (PETN), 70% red lead, and, as a binder, 10% of a 50/50 mixture of butyl rubber and a thermoplastic terpene resin, commercially available as "Piccolyte" S-10. This composition is readily extruded into sheet and detonates at a velocity of about 4100 meters per second. Complete details of the composition and a suitable method for its manufacture are described in U.S. Patent 3,093,521.

Composition B is is a modification of composition A containing 8%, rather than 10% of the butyl rubber-thermoplastic terpene resin binder, and 2% polybutene.

The titanium carbide and titanium and zirconium borides used in the examples are commercial materials of at least 96% purity. The carbide contains less than 0.5% free carbon.

EXAMPLE 1

A cremet is prepared as follows:

A solid cylindrical aluminium plug having a diameter of 1¾ inches and a length of 1¼ inches is inserted 1 inch into the end of a seamless aluminum tube having an outside diameter of 2 inches, a wall thickness of ⅛ inch and a length of 7 inches and welded in place thus sealing one end of the tube. The bore of the tube is lined with paper and vibrator-packed to within 1 inch of the open end of the tube with a mixture containing 88% by weight of titanium carbide powder having a particle size less than 44 microns and 12% by weight of aluminum powder also having a particle size less than 44 microns. The mixture is prepared by mixing the constituent powders in a twin-cone blender for one hour. The titanium carbide-aluminum powder mixture thus packed has a bulk density of about 2.15 grams per cubic centimeter. A second aluminum plug 1¼ inches in length is inserted 1 inch into the open end of the tube assembly and welded in place to form an assembly substantially as illustrated in FIGURE 2 of the attached drawings.

A rectangular sheet of the above-described explosive composition B having a weight distribution of 16 grams per square inch is glued around the outside wall of the aluminum tube, encircling the tube for its entire length. A triangular line-wave generator (as described in U.S. Patent No. 2,943,571 issued July 5, 1960) is glued to the edge of the sheet explosive which conforms to the upper periphery of the aluminum tube. An electric blasting cap is fastened to the apex of the line-wave generator and the assembly is immersed in water. The blasting cap is actuated by application of an electric current thus initiating the line-wave generator which, in turn, initiates the sheet of explosive. After the detonation, the end-plugs are cut off and the remaining assembly is heated for 2 hours at 800° C. in a carbon dioxide atmosphere. The heat treatment melts and thus removes the constricted aluminum tubes. X-ray diffraction of a sample of the cemented carbide gives the following pattern of lattice spacings, $d$, A, and relative intensities, $I/I_1$:

| $d$, A | 2.78 | 2.69 | 2.51 | 2.40 | 2.31 | 2.17 | 1.93 | |
|---|---|---|---|---|---|---|---|---|
| $I/I_1$ | <5 | <5 | <5 | <5 | 10 | 100 | <5 | |
| $d$, A | 1.53 | 1.31 | 1.25 | 1.08 | .994 | .968 | .883 | .833 |
| $I/I_1$ | 45 | 25 | 10 | 5 | 5 | 15 | 15 | 10 |

The observed lattice spacings and relative intensities correspond to those for titanium carbide, free aluminium, and titanium-aluminum alloys TiAl and $TiAl_3$ in the A.S.T.M. card file, establishing that a reaction takes place between aluminum and titanium. Metallographic examination of the microstructure of the novel cermet reveals that the aluminum completely coats and cements the particles of titanium carbide and that needles and/or plates of the titanium-aluminum alloys are randomly oriented throughout the cemented carbide structure as shown in FIGURES 1a to 1c.

The cemented carbide thus produced has a density of 4.20 grams per cubic centimeter, a transverse rupture strength of 27,850 pounds per square inch and diamond pyramid hardness number under a 1000-gram load of 1030. The oxidation resistance of the novel composition is very good, e.g., the weight increase of a sample cut from the cermet is less than 3.1 milligrams per square centimeter of surface area in 17 hours at 1100° C. in air. The cermet can be heated to 600° C. and immersed in water at room temperature (ca. 20–25° C.), or can be at room temperature and immersed into molten aluminum at 8000° C. without cracking. The electrical resistivity of the cermet after immersion in molten Al at 950° C. for 2 hours is about $45 \times 10^{-6}$ ohm-cm.

EXAMPLE 2

A composition similar to that described in Example 1 is prepared according to the following procedure:

A seamless aluminum tube having an outside diameter of 1 inch, a wall thickness of ¼ inch, and a length of 8 inches is positioned concentrically within a second seamless aluminum tube having an outside diameter of 2 inches, a wall thickness of ⅛ inch, and a length of 7 inches. An aluminum plug 1¼ inches in length is inserted 1 inch into one end of the annulus between the adjacent walls of the two tubes and welded in place thus sealing one end of the annulus. The adjacent walls of the aluminum tubes are lined with paper and the annulus between the walls, vibrator-packed to within 1 inch of the open end of the annulus with a titanium carbide-aluminum powder mixture prepared as in Example 1. The titanium carbide-aluminum powder mixture thus packed has a bulk density of about 2.1 grams per cubic centimeter. A second aluminum plug 1¼ inches in length is inserted 1 inch into the open end of the annulus and welded in place. A air-filled copper tube, sealed at both ends, having an outside diameter of ¼ inch, a wall thickness of ½₂ inch, and a length of about 7¾ inches is positioned concentrically within the inner aluminum tube in such a manner that a portion of the copper tube about ⅛ inch in length extends beyond each end of the compaction assembly and is taped in place to form an assembly substantially as illustrated in FIGURE 3 of the attached drawings.

A sheet of explosive composition B having a weight distribution of 22 grams per square inch is glued to the outside wall of the outer aluminum tube. A line-wave generator and an electric blasting cap are attached as in Example 1 and the assembly is immersed in water which flows into the annulus between the outside wall of the copper tube and the inside wall of the inner aluminum tube. The explosive is initiated, and after the detonation the end plugs are cut off and the copper tube is removed. The remaining assembly is subjected to heat treatment as in Example 1 during which process the constricted aluminum tubes are melted off.

Photomicrographs of polished and etched sections of the new material show that the aluminum binder forms a mechanically interlocking structure around each titanium carbide particle. X-ray diffraction of a sample of the cemented carbide gives the following pattern of lattice spacing, $d$, A, and relative intensities, $I/I_1$:

| $d$, A | 2.50 | 2.34 | 2.29 | 2.16 | 2.02 |
|---|---|---|---|---|---|
| $I/I_1$ | 80 | 10 | 5 | 100 | 5 |
| $d$, A | 1.92 | 1.53 | 1.43 | 1.30 | 1.25 |
| $I/I_1$ | 1 | 40 | 1 | 20 | 10 |

The observed lattice spacings and relative intensities correspond to those for titanium carbide, titanium-aluminum alloy $TiAl_3$, and free aluminum in the A.S.T.M. card file, establishing that some reaction takes place between aluminum and titanium.

The density of the cemented carbide thus produced is 4.23 grams per cubic centimeter, and the transverse rupture strength is 33,250 pounds per square inch. The composition has a diamond pyramid hardness number of 1050 under a 1000-gram load. The oxidation resistance of the titanium carbide-aluminum composition at high temperatures is very good, e.g., a specimen gains less than 8 milligrams per square centimeter of surface area after 12 hours in air at 1025° C. The thermal shock resistance of this novel cermet which contains only the one titanium-aluminum alloy, $TiAl_3$, is equivalent to that of the cermet described in Example 1 as indicated by immersion at room temperature into molten aluminum at 800° C., and heating to 600° C. followed by immersion in water at room temperature. The electrical resistivity is also equivalent.

EXAMPLE 3

A composition comprising titanium carbide and aluminum combined as in the preceding examples is prepared as follows:

A seamless mild steel tube having an outside diameter of 1½ inches, a wall thickness of ¼ inch, and a length of 7 inches is inserted through the bore of a seamless aluminum tube having an outside diameter of 1⅝ inches, a wall thickness of 1/32 inch, and a length of 5 inches in such a manner that a portion of the mild steel tube 1 inch in length extends beyond each end of the aluminum tube. A second seamless aluminum tube having an outside diameter of 2.95 inches, a wall thickness of ¼ inch, and a length of 5 inches is inserted within the bore of a second seamless mild steel tube having an inside diameter of 3 inches, a wall thickness of ⅛ inch, and a length of 7 inches in such a manner that a portion of the mild steel tube 1 inch in length extends beyond each end of the aluminum tube. The first set of tube is positioned concentrically within the second set of tubes and a steel plug 1¼ inches in length is inserted 1 inch into one end of the annulus between the adjacent walls of the mild steel tubes sealing one end of the annulus. The annulus between the adjacent walls of the aluminum tubes is vibrator-packed to within 1 inch of the open end of the tube assembly with titanium carbide powder having a particle size less than 44 microns. The powder thus packed has a bulk density of approximately 2.3 grams per cubic centimeter. A second steel plug 1¼ inches in length is inserted 1 inch into the open end of the tube assembly and welded in place.

The compaction assembly is evacuated to $2.5 \times 10^{-4}$ mm. of mercury by conventional means through a piece of copper tubing inserted into a hole drilled in one plug. An air-filled copper tube sealed at both ends having an outside diameter of ½ inch, a wall thickness of 1/32 inch, and a length of about 7¾ inches is positioned concentrically within the inner mild steel tube and is taped in place as in Example 2.

The explosive employed in this example is an extruded sheet of explosive composition A having a weight distribution of 22 grams per square inch. The sheet of exposure is glued around the outside wall of the outer mild steel tube and a line-wave generator and a No. 8 electric blasting cap are attached as in the preceding examples. The assembly is immersed in water which flows into the annulus between the adjacent walls of the copper tube and the inner mild steel tube, and the explosive is initiated as in the preceding examples.

After the detonation the copper tube is removed. The remaining assembly is heated unopened for two hours at 800° C. in a muffle furnace and furnace cooled. The end plugs are cut off and the inner mild steel tube is slit and mechanically removed. It is found that the titanium carbide compact is penetrated by aluminum from the aluminum tubes. The remnants of the aluminum tubes are melted by heating the assembly at 800° C. in a carbon dioxide atmosphere and the outer mild steel is mechanically removed.

X-ray diffraction of a sample of the cemented carbide gives the following pattern of lattice spacings, $d$, A, and relative intensities, $I/I_1$:

| $d$, A | 2.51 | 2.31 | 2.18 | 1.93 | 1.68 | 1.53 | 1.43 |
|---|---|---|---|---|---|---|---|
| $I/I_1$ | 85 | 20 | 100 | 10 | 5 | 45 | 5 |
| $d$, A | 1.31 | 1.25 | 1.17 | 1.08 | .996 | .969 | |
| $I/I_1$ | 25 | 20 | 5 | 10 | 10 | 15 | |

The observed lattice spacings and relative intensities correspond to those for titanium carbide, aluminum, and titanium-aluminum alloys, TiAl and $TiAl_3$ in the A.S.T.M. card file. Metallographic examination and photomicrographs of the cermet thus produced reveal a microstructure similar to that of the cementer carbide described in Example 1. Chemical analysis reveals that the total amount by weight of free and combined aluminum in the novel cermet is about 12%.

The density of the cemented carbide thus produced is 4.44 grams per cubic centimeter, and the transverse rupture strength is 52,600 pounds per square inch. The composition has a diamond pyramid hardness number of 1160 under a 1000-gram load. The oxidation resistance at high temperatures of the composition is very good, e.g., a specimen gains less than 7 milligrams per square centimeter of surface area after 12 hours at 1925° C.; and the electrical resistivity and thermal shock resistance are comparable to those of the cermets described in the preceding examples.

EXAMPLE 4

A composition comprising titanium carbide and aluminum combined as in the preceding example is prepared from a mixture of 80% by weight of titanium carbide having a particle size less than 44 microns and 20% by weight of aluminum having a particle size less than 44 microns. The assembly is arranged and detonation and heat treatment are carried out as in Example 1. Prior to detonation, the bulk density of the powder mixture as packed in the aluminum tube is 2.15 grams per cubic centimeter. The explosive employed in this example is a sheet of explosive composition B having a weight distribution of 9 grams per square inch. X-ray diffraction reveals the presence of the titanium-aluminum intermetallic compounds or alloys, TiAl and $TiAl_3$, in the novel cermet.

The cemented structure thus produced has a density of 3.85 grams per cubic centimeter and a transverse-rupture strength of 52,000 pounds per square inch. The electrical resistivity of the aluminum-bonded titanium carbide cermet is substantially lower than that of a sintered hot-pressed compact of pure titanium carbide, i.e., $44 \times 10^{-6}$ ohm-centimeters versus $70 \times 10^{-6}$ ohm-centimeters. The cold cermet is immersed in molten aluminum at 950° C. without cracking. Upon standing in the molten aluminum at 950° C. for a period of 24 hours, the cermet exhibits good wetting by the molten aluminum and shows excellent resistance to the molten aluminum, i.e., no dissolution (no weight loss), and no change in the dimensions of the cermet are observed. No cracks in the aluminum-bonded cermet are observed when the cermet is heated to about 600° C. and is plunged into cool water. The oxidation resistance of the aluminum-bonded cermet is very good.

EXAMPLE 5

A composition comprising titanium carbide and aluminum combined as in the preceding examples is prepared from a mixture of 75 percent by weight of titanium carbide having a particle size less than 44 microns and 25 percent by weight of aluminum having a particle size less than 44 microns. The assembly is arranged and detonation is carried out as in Example 1. After detonation the end-plugs are cut off and the remaining assembly is heated for 1 hour at 950° C. in a hydrogen atmosphere. The explosive employed in this example is a sheet of explosive composition B having a weight distribution of 14 grams per square inch. X-ray diffraction reveals the presence of the titanium-aluminum alloys TiAl and $TiAl_3$ in the novel cermet.

The cemented structure thus produced has a density of 3.83 grams per cubic centimeter and a transverse rupture strength of 52,000 pounds per square inch. The electrical resistivity of the cermet is $42 \times 10^{-6}$ ohm-centimeters; it exhibits good oxidation resistance, i.e., a sample gains less than 2.3 milligrams per square centimeter of surface area after 19 hours at 1100° C. The thermal shock resistance is comparable to that of the cermets described in the preceding examples.

EXAMPLE 6

A cermet comprising titanium carbide and aluminum combined as in the preceding examples is prepared from a mixture of 80 parts by weight of titanium carbide and 20 parts by weight of aluminum, both powders having particle sizes smaller than 44 microns, which mixture is prepared by mixing the constituent powders in a twin-cone blender for an hour as in the preceding examples. A 5-gram sample of the powder mixture is hydraulically pressed under 20 tons per square inch pressure into a coherent compact which is heated for 1 hour at 1100° C. in a hydrogen atmosphere.

X-ray diffraction of a sample of the novel cermet gives the following pattern of lattice spacings, $d$, A, and relative intensities, $I/I_1$, which correspond to those for titanium carbide, aluminum, and the titanium-aluminum alloys, TiAl and $TiAl_3$, in the A.S.T.M. card file:

| d, A | 2.51 | 2.34 | 2.29 | 2.17 | 2.03 | 1.92 | 1.53 |
|---|---|---|---|---|---|---|---|
| $I/I_1$ | 80 | 20 | 15 | 100 | 10 | 5 | 35 |
| d, A | 1.43 | 1.31 | 1.25 | 1.22 | | | |
| $I/I_1$ | 5 | 20 | 8 | 5 | | | |

Metallographic examination reveals that the microstructure of the novel aluminum-bonded cermet is equivalent to that of the cermets described in the preceding examples, i.e., substantially as illustrated in FIGURES 1a and to 1c.

The cermet is immersed in molten aluminum at 950° C. for 1 hour after which the cermet contains about 25% aluminum, has a density of about 3.68 grams per cubic centimeter, an electrical resistivity of $17 \times 10^{-6}$ ohm-centimeters, and a transverse rupture strength of 76,500 pounds per square inch.

EXAMPLE 7

An aluminum-bonded cermet in which the ceramic component comprises a mixture of titanium carbide and titanium boride is prepared from a mixture of 56% by weight of titanium carbide, 14% by weight of titanium boride, and 30% by weight of aluminum, all of the powders having a particle size smaller than 44 microns. The assembly is arranged and detonation is carried out as in Example 1. The explosive employed in this example is a sheet of explosive composition B having a weight distribution of 9 grams per square inch. After the detonation the end plugs are cut off and the remaining assembly is heated for 1 hour at 1100° C. in a hydrogen atmosphere.

X-ray diffraction of a sample of the novel cermet gives the following pattern of lattice spacings, $d$, A and relative intensities, $I/I_1$ which correspond to those for titanium carbide, titanium boride, aluminum, and the titanium-aluminum alloys, TiAl and $TiAl_3$, in the A.S.T.M. card file:

| d, A | 3.23 | 2.63 | 3.50 | 2.34 | 2.31 | 2.30 | 2.17 | 2.04 | 2.02 |
|---|---|---|---|---|---|---|---|---|---|
| $I/I_1$ | 13 | 9 | 54 | 30 | 1 | 1 | 100 | 25 | 13 |

Metallographic examination of the microstructure of the novel cermet reveals that the aluminum completely coats and cements the particles of titanium carbide and titanium boride and that needles and/or plates of the titanium-aluminum alloys are randomly oriented throughout the cemented structure in a manner substantially as shown in FIGURES 1a to 1c.

The cemented structure thus produced has very low electrical resistivity, i.e., $18.7 \times 10^{-6}$ ohm-centimeters, very good oxidation resistance, a density of 3.43 grams per cubic centimeter, a transverse rupture strength of 52,700 pounds per square inch, and a thermal shock resistance such that it withstands a temperature differential of more than 600° C. when tested as in the preceding examples.

EXAMPLE 8

The procedure of Example 7 is repeated with the following exceptions: (1) the cermet is prepared from a mixture of 64% by weight of titanium carbide, 16% by weight of titanium boride, and 20% by weight of aluminum; (2) the weight distribution of the explosive sheet is 8 grams per square inch; (3) and the heating is effected at 800° C. in a carbon dioxide atmosphere.

X-ray diffraction of a sample of the cermet shows the presence of titanium carbide, titanium boride, aluminum, TiAl, and $TiAl_3$. Metallographic examination of the microstructure of the cermet reveals the same microstructure as that of the cermet prepared according to Example 7.

The cemented structure thus produced has an electrical resistivity of $35 \times 10^{-6}$ ohm-centimeters, a transverse rupture strength at room temperature of 35,000–42,000 pounds per square inch, and a thermal shock resistance such that it withstands a temperature differential of more than 600° C. when tested as in the preceding examples. After the cermet has been immersed in molten aluminum at 950° C. for 2 hours, the electrical resistivity is $22 \times 10^{-6}$ ohm-centimeters, the transverse rupture strength at room temperature is 50,000–60,000 pounds per square inch, and the oxidation resistance is very good, i.e., the weight increase of a sample cut from the cermet is 2.3 milligrams per square centimeter of surface after 17 hours at 1000° C. in air.

EXAMPLE 9

A. A cermet comprising aluminum-bonded titanium boride is prepared from a mixture of 80% by weight of titanium boride powder having a particle size of 10 microns, 15% by weight of atomized aluminum, and 5% by weight of flake aluminum powder, both aluminum powders being of a size to pass through a 325-mesh screen. The assembly is arranged and detonation and heat treatment are carried out as in Example 2 (except the heating is for 0.5 hour in a hydrogen atmosphere). The explosive employed in this example is a sheet of explosive composition B having a weight distribution of 8 grams per square inch.

X-ray diffraction of a sample of the cermet shows the presence of titanium diboride and aluminum. No titanium-aluminum alloy is detected.

Metallographic examination of the novel cermet reveals that the aluminum completely coats and cements the particles of titanium boride.

The cemented structure thus produced exhibits an unusually low electrical resistivity, i.e., $10–14.4 \times 10^{-6}$ ohm-centimeters, has a density of 3.58 grams per cubic centimeter and a transverse rupture strength of 28,700–39,500 pounds per square inch, has a very good resistance to oxidation (no oxide growth is observed on this compact after heating in air at 800° C. for several hours), and is very resistant to thermal shock, i.e., no cracking is observed either when the heated compact at 600° C. is plunged into cool water or when the compact at room temperature is plunged into molten aluminum at 800° C. After immersion in molten aluminum at 950° C. for 1 hour, the cermet has an electrical resistivity of $8-14.8 \times 10^{-6}$ ohm-centimeters, and a transverse rupture strength of 56,000–67,000 pounds per square inch.

B. When the foregoing procedure is repeated with a mixture of 50% of titanium diboride, 40% atomized aluminum, and 10% flake aluminum, and the heating takes place in a hydrogen atmosphere for 1 hour, the resulting cermet disintegrates upon immersion in molten aluminum at 950° C.

EXAMPLE 10

A mixture of powders the same as that employed in Example 9–A is hydraulically pressed under 10 tons per square inch pressure into coherent compacts in the form of bars 4 inches long and 0.5 inch square. The bars are heated for 2 hours at 1300° C. in an argon atmosphere. The X-ray diffraction pattern of the cermet reveals the presence of $TiAl_3$, $TiB_2$ and aluminum. Metallographic examination of the microstructure reveals that the aluminum completely coats and cements the particles of titanium diboride and that needles and/or plates of the titanium-aluminum alloy are randomly oriented throughout the cemented boride structure in a manner substantially as shown in FIGURE 1a to 1c. The electrical resistivity is $17-20 \times 10^{-6}$ ohm-centimeters, and the transverse rupture strength is 20,041 pounds per square inch. After immersion in molten aluminum at 950° C. for 1 hour, the cermet has an electrical resistivity of $6-8 \times 10^{-6}$ ohm-centimeters and a transverse rupture strength between 40,000 and 70,000 ponds per square inch.

EXAMPLE 11

A cermet comprising aluminum-bonded zirconium boride is prepared from a mixture of 80% by weight of zirconium boride powder having a particle size of 10 microns, 10% by weight of atomized aluminum powder, and 10% by weight of flake aluminum powder, both aluminum powders being of 325-mesh size. The procedure of Example 1 is employed, except that the explosive has a weight distribution of 8 grams per square inch, and the compact is heated for 1 hour at 1100° C. in a hydrogen atmosphere.

X-ray diffraction of a sample of the cermet shows the presence of zirconium diboride and aluminum. No zirconium-aluminum intermetallic compound is detected.

Metallographic examination of the microstructure of the novel cermet reveals that the aluminum completely coats and cements the particles of zirconium boride.

The cemented structure thus produced exhibits an unusually low electrical resistivity, i.e., $7-8 \times 10^{-6}$ ohm-centimeters, and has a transverse rupture strength of 39,700–48,100 pounds per square inch.

EXAMPLE 12

The same powder mixture employed in Example 11 is subjected to the treatment described in Example 10, except that the bars are heated for 1 hour at 1100° C. and immersion in molten aluminum is omitted. The cermet produced has the same X-ray diffraction pattern and microstructure as the cermet obtained according to Example 11. The electrical resistivity is $11-12 \times 10^{-6}$ ohm-centimeters, and the transverse rupture strength is 20,200 pounds per square inch.

What is claimed is:

1. A cermet comprising a mixture of finely divided titanium carbide and titanium boride bonded by about 10% to about 30% free and combined aluminum, based on the total weight of the cermet, said combined aluminum being present as at least one of the intermetallic compounds selected from the group consisting of TiAl and $TiAl_3$, said cermet being characterized by being essentially free of self-bonding between particles of the finely divided carbide and boride and having substantially all of said particles coated with metallic aluminum.

2. A cermet as in claim 1 wherein titanium boride is present in the amount of about 10% to about 60% by weight based on the total weight of the cermet and the amount of aluminum bonding said carbide and boride is about 15% to about 25% by weight based on the total weight of said cermet.

3. A cermet as in claim 1 comprising at least 90% by weight of metallic aluminum, titanium carbide and titanium boride.

4. A cermet as in claim 1 wherein the amount of said free and combined aluminum is about 15% to about 25% based on the total weight of the cermet, and the cermet has a maximum electrical resistivity of about $45 \times 10^{-6}$ ohm-centimeters, a transverse rupture strength of at least about 30,000 p.s.i., a thermal shock resistance such that it withstands an abrupt temperature change of at least about 600° C. without cracking, and an oxidation resistance such that its weight gain after 17 hours at 1,000° C. in air is a maximum of 5 milligrams per square centimeter of surface.

5. A cermet comprising a finely divided ceramic component of titanium carbide alone or in admixture with at least one boride selected from the group consisting of titanium boride and zirconium boride, which ceramic component is bonded by from about 10% to about 30% free and combined aluminum based on the total weight of cermet, said combined aluminum being present as at least one intermetallic compound selected from the group consisting of TiAl and $TiAl_3$, and said cermet being characterized by being essentially free of self-bonding between particles of the finely divided ceramic components and having substantially all of said particles coated with metallic aluminum.

6. A cermet as in claim 5 wherein said ceramic component and metallic aluminum comprise at least 90% of the cermet by weight.

7. A cermet as in claim 5 wherein the amount of free and combined aluminum bonding said ceramic component is about 15% to about 25% by weight based on the total weight of said cermet, said cermet having a maximum electrical resistivity of about $45 \times 10^{-6}$ ohm-centimeters, a transverse rupture strength of at least about 30,000 pounds per square inch, a thermal shock resistance such that it withstands an abrupt temperature change of at least about 600° C. without cracking, and an oxidation resistance such that its weight gain after 17 hours at 1000° C. in air is a maximum of 5 milligrams per square centimeter of surface.

8. A cermet as in claim 5 wherein said ceramic component is titanium carbide and the amount of free and combined aluminum bonding said carbide is about 15% to about 25% by weight based on the total weight of said cermet.

References Cited

UNITED STATES PATENTS

| | | | |
|---|---|---|---|
| 2,672,426 | 3/1954 | Grubel et al. | 29—182.5 |
| 2,915,442 | 12/1959 | Lewis | 204—67 |
| 3,037,857 | 6/1962 | Conant | 75—138 |
| 3,178,807 | 4/1965 | Bergmann | 29—182.5 |
| 3,274,093 | 9/1966 | McMinn | 204—279 XR |

FOREIGN PATENTS 824,202  11/1959  Great Britain.

HOWARD S. WILLIAMS, Primary Examiner

D. R. VALENTINE, Assistant Examiner

U.S. Cl. X.R.

29—182; 75—138; 204—291, 292